(12) United States Patent
Meyer et al.

(10) Patent No.: US 6,595,148 B2
(45) Date of Patent: Jul. 22, 2003

(54) INDIVIDUAL SEED HOPPERS FORMING BANKS OF SEED HOPPERS

(75) Inventors: Bradley John Meyer, Davenport, IA (US); Donald Keith Landphair, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/021,580

(22) Filed: Dec. 18, 2001

(65) Prior Publication Data

US 2003/0110999 A1 Jun. 19, 2003

(51) Int. Cl.⁷ .................................................. A01C 7/18
(52) U.S. Cl. ........................................... 111/63; 111/24
(58) Field of Search ............................... 111/52, 53, 59, 111/13, 18, 22, 200, 74, 75, 76, 77, 8, 9, 14, 25, 34, 35, 63, 170, 177, 186

(56) References Cited

U.S. PATENT DOCUMENTS

| | | | |
|---|---|---|---|
| 3,645,416 A | * 2/1972 | Main, Jr. ..................... | 220/563 |
| 3,915,343 A | * 10/1975 | Barcock ....................... | 222/129 |
| 3,924,783 A | * 12/1975 | Ward ........................... | 222/134 |
| 4,137,852 A | 2/1979 | Pratt .............................. | 111/57 |
| 5,170,909 A | 12/1992 | Lundie et al. ................ | 221/211 |
| 5,325,800 A | 7/1994 | Wisor et al. .................. | 111/185 |
| 5,398,771 A | * 3/1995 | Hornung et al. ............. | 172/311 |
| 5,720,233 A | 2/1998 | Lodico et al. ................ | 111/184 |
| 5,740,746 A | * 4/1998 | Ledermann et al. ......... | 111/174 |
| 5,915,313 A | * 6/1999 | Bender et al. ................ | 111/178 |
| 6,494,154 B2 | * 12/2002 | Kinzenbaw et al. .......... | 111/54 |

OTHER PUBLICATIONS

Brochure "Semeadora Para Graos Graudos Par 5000/6000/7000 Trans"; date unknow; 11 pages.

* cited by examiner

*Primary Examiner*—Thomas B. Will
*Assistant Examiner*—Nathan Mammen

(57) ABSTRACT

A seeding machine is provided with banks of individual seed hoppers for directing seed to auxiliary seed hoppers located on individual planting units. The individual seed hoppers of each bank are provided with adjoining walls. The adjoining walls have notches so that seed in one individual seed hopper can flow into an adjoining individual seed hopper. A portion of the planting units can be disabled by placing them in a non-working position. The individual seed hoppers supplying seed to the disabled planting units are provided with removable baffles. Each removable baffle is provided with a downwardly extending leg that cooperates with the notches to prevent seed in an active individual hopper from entering an inactive individual hopper.

6 Claims, 8 Drawing Sheets

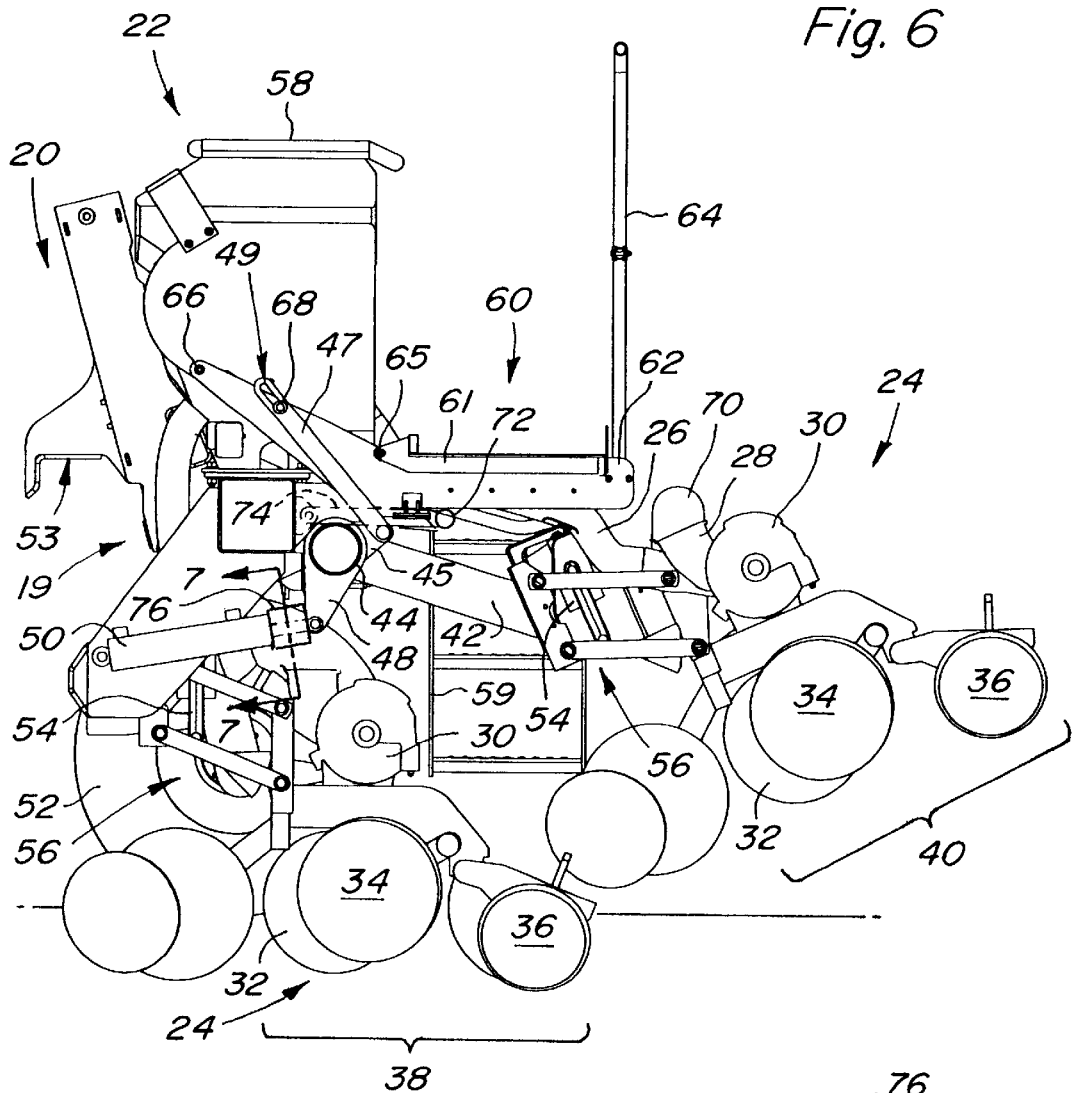
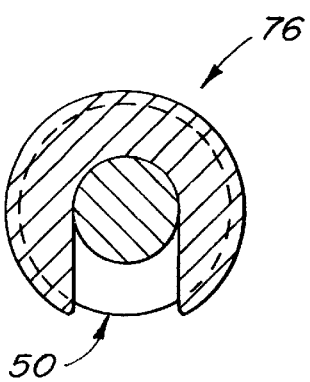
Fig. 6
Fig. 7

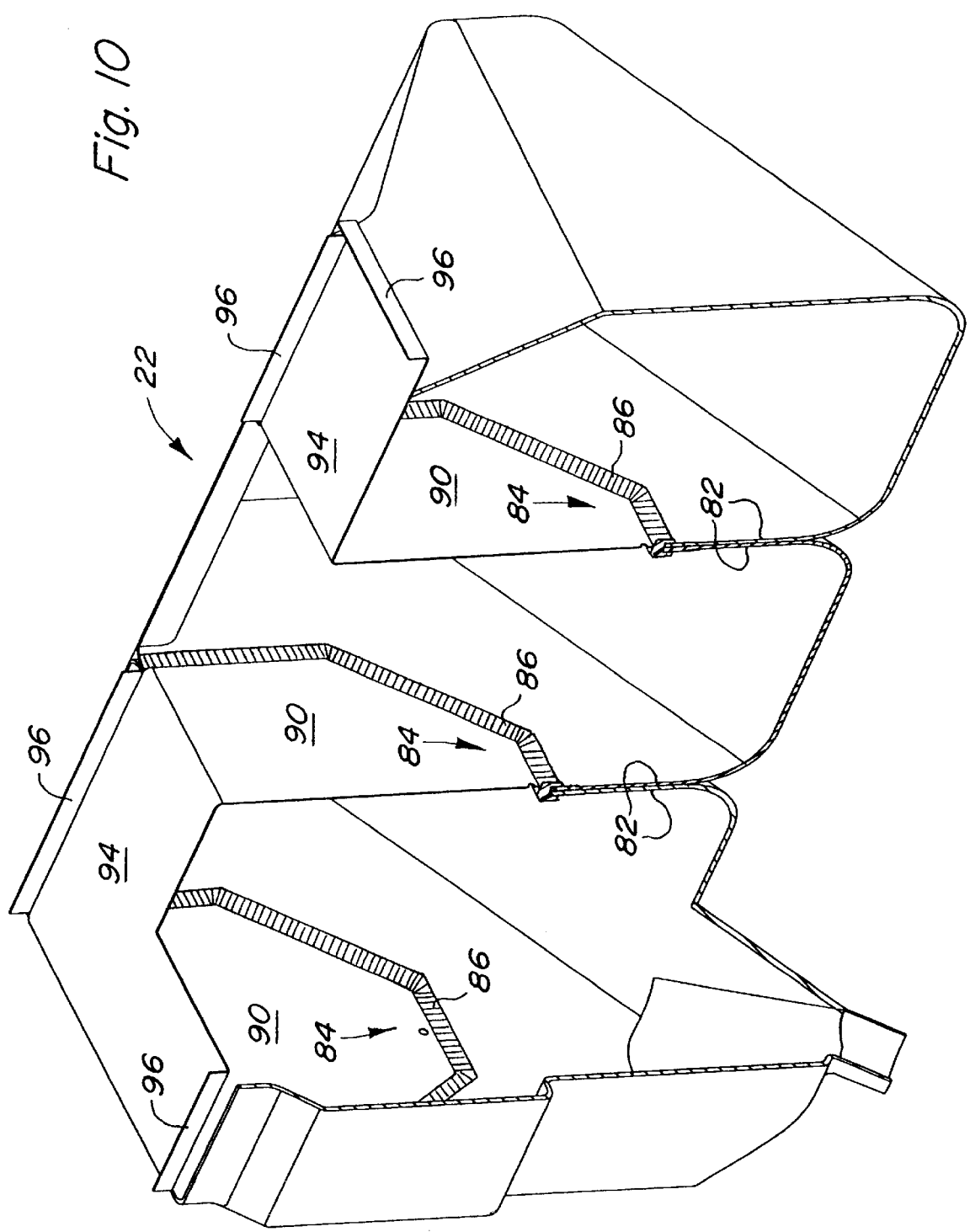

INDIVIDUAL SEED HOPPERS FORMING BANKS OF SEED HOPPERS

FIELD OF THE INVENTION

The present invention is directed to a bank of individual seed hoppers having notches between adjoining walls to permit the flow of seed between the individual hoppers and removable baffles to prevent the flow between the individual hoppers.

BACKGROUNDS OF THE INVENTION

Agricultural implements, like seeding machines, have a wide transverse working configuration so that the machine covers as much ground as possible in a single pass. Typically, the seeding machine can be folded from its working configuration into a more manageable transport configuration.

Some seeding machines are provided with a frame having a central main frame segment and two wing frame segments. The central main frame segment is provided with a forwardly extending tow bar for coupling the machine to a tractor. The wing frame segments are pivotally coupled to the main frame by fore/aft extending axes so that the wings can flex relative to the main frame to allow the wing frames to more closely follow the contour of the ground. Individual planting units are mounted to the frame segments by parallelogram linkages so that the planting units can move a limited amount up and down relative to the respective frame segment. One method of folding the frame of the seeding machine described above is to forwardly fold the wings along the tow bar.

Typically grain drills and air seeders are used to plant closely spaced crops. These seeding machines are provided with bulk hoppers, which transmits the seed directly to seed meters for metering the flow of seed to the planting furrow. Typical row crop planters have been used to plant crops having wider row spacings. Row crop planters have a series of planting units. Each planting unit is provided with an individual seed hopper, a seed meter and a furrow opener. It is also known to direct seed from a bulk hopper towed behind the seeding machine to the individual hoppers of the planting units by a pneumatic supply system.

To plant on more closely spaced rows it is known to interleave the planting units. All of the planting units can be used to plant a narrow row crop or selective planting units can be raised to planter a wider row crop.

It is also known to pivot planting units on their noses from a horizontal planting position to a more vertical non-planting position.

SUMMARY OF THE INVENTION

A seeding machine comprises a main frame segment and two wing frame segments. In its working configuration the seeding machine extends transversely. In its transport configuration the wing frame segments are folded forwardly. All three frame segments are provided with interleaved planting units forming a front rank of planting units and a rear rank of planting units. The rear ranks of planting units are mounted to the wing frame segments by pivot arms that extend downwardly and rearwardly from the wing frame segments. The pivot arms are pivotally mounted to the wing frame segments by a rockshaft. The rockshaft is provided with an actuator bell crank that is coupled to a linear actuator for rotating the rockshaft relative to the wing frame segments. The pivot arms have a working position, wherein the planting units are in their working position, and a transport position, wherein the planting units have been pivoted on their noses into their substantially vertical transport position. By rotated the planting units on the wing frame segments on their noses, the transport width of the seeding machine is reduced, when the wing frame segments are forwardly folded.

The frame segments are provided with banks of individual seed hoppers. Each of the planting units is provided with an auxiliary seed hopper. The individual seed hoppers feed seed to the auxiliary seed hoppers through flexible tubes. One tube extends between one auxiliary seed hopper and one individual seed hopper. The individual seed hoppers of each bank are provided with adjoining walls. The adjoining walls have notches so that the individual hoppers communicate with one another. In this way, the bank of seed hoppers can be filled in a bulk fill method similar to grain drills.

The rear rank of planting units can be disabled by placing them in a non-working position. As such, the seeding machine can plant seed in two different row width conditions. When the rear rank of planting units are disabled, the banks of seed hoppers are provided with removable baffles. Each removable baffle is provided with a leg that cooperates with the notches to prevent seed in an active individual hopper from entering an inactive individual hopper. When the removable baffles are inserted into the bank of individual seed hoppers, the individual seed hoppers are filled in the same manner as row crop planters, that is one at a time.

BRIEF DESCRIPTION OF THE DRAWINGS

FIG. 6 is a right side view of a wing frame segment of the seeding machine of the present invention wherein the rear ranks of planting units are in their intermediate holding position.

FIG. 7 is a partial cross sectional view taken along line 7—7 of FIG. 6.

FIGS. 10 is a cross sectional perspective view of the bank of seed hopper.

DESCRIPTION OF THE PREFERRED EMBODIMENT

Figure 1:
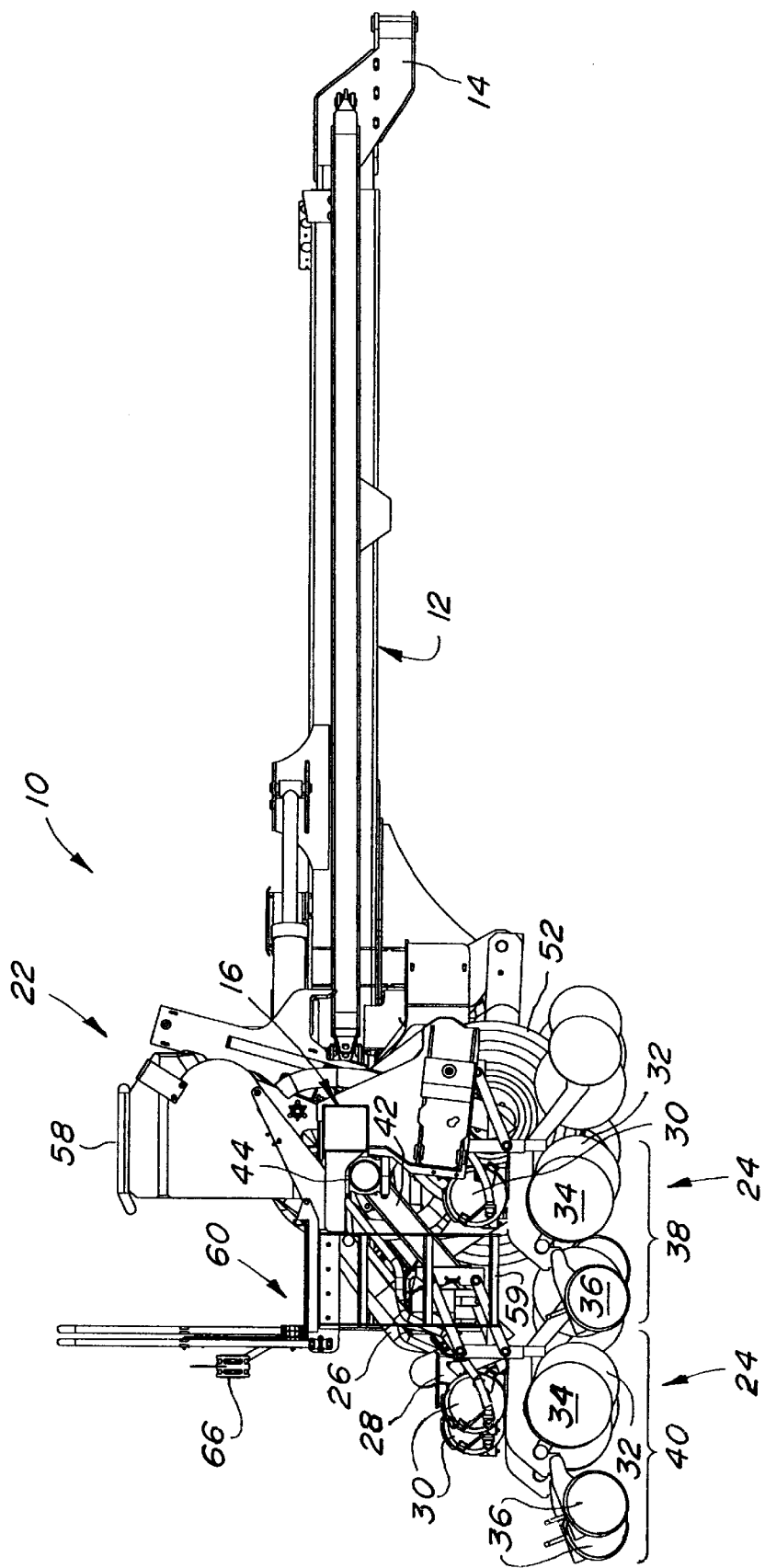
FIG. 1 is a side view of a seeding machine of the present invention in its working configuration.
Figure 2:
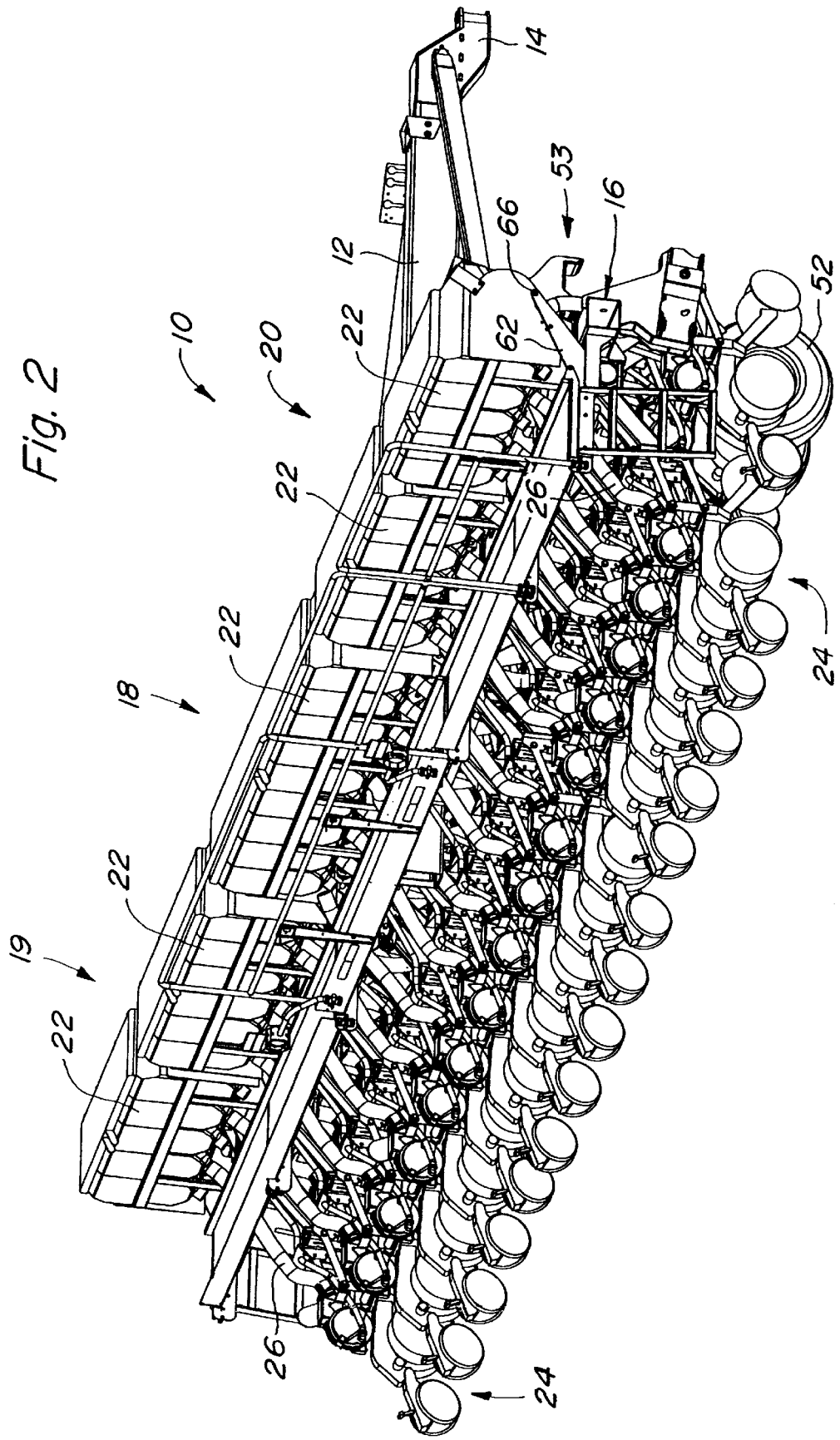
FIG. 2 is a rear perspective view of a seeding machine of the present invention in its working configuration with the planting units raised.

FIG. 1 is a side view of a towed agricultural implement in the form of a seeding machine 10. The seeding machine 10 is coupled to a tractor by a tow bar 12 having a hitch 14. The tow bar 12 extends forwardly from a frame 16. The frame comprises three frame segments, a main frame 18, and left and right wing frames 19 and 20. The wing frames 19 and 20 can be pivoted relative to the main frame 18 about left and right fore/aft extending pivots 21. These fore/aft extending pivots 21 permit the wing frames 19 and 20 to better follow the contour of the ground as the seeding machine 10 is being pulled through the field. The wing frames 19 and 20 can also be folded in a forward manner about vertically extending pivots, so that the seeding machine 10 assumes the transport configuration illustrated in FIG. 3.

Each of the frame segments 18, 19 and 20 are provided with banks of seed hoppers 22. The banks of seed hoppers 22 direct seed to individual planting units 24 by means of flexible tubes 26. In the illustrated embodiment, each planting unit 24 comprises an auxiliary hopper 28, a seed meter 30, a furrow opener 32, depth gauging wheels 34 and furrow closing wheels 36. Seed is directed into the auxiliary hopper 28 by flexible tube 26. Seed is then metered by the seed meter 30. In the illustrated embodiment, the seed meter 30 is a vacuum seed meter coupled to a vacuum line 31. The metered seed is then directed to a seed tube, not shown, which directs the seed into the planting furrow formed by the furrow opener 32. The planting furrow is then closed by the furrow closing wheels 36, sealing the seed in the closed planting furrow.

The planting units 24 are arranged in a front rank 38 and a rear rank 40 on each frame segment 18, 19 and 20. The front ranks 38 of planting units 24 are mounted directly to the frame segments 18, 19 and 20, so the front ranks 38 move with the respective frame segment. Similarly, the rear rank 40 of main frame planting units is mounted to the main frame segment 18, so they move with the main frame segment 18. The rear ranks 40 of planting units 24 mounted on the wing frame segments 19 and 20 are mounted to pivot arms 42 that extend downwardly and rearwardly from a rock shaft 44. The rockshaft 44 is rotatably coupled to the wing frame segment 20 by bearings 46. An actuator bell crank 48 that is driven by linear motor 50 rotates the rockshaft 44. In the illustrated embodiment, the linear motor 50 is a double acting hydraulic cylinder. The front rank 38 and the rear rank 40 of planting units 24 are interleaved with one another.

Figure 3:
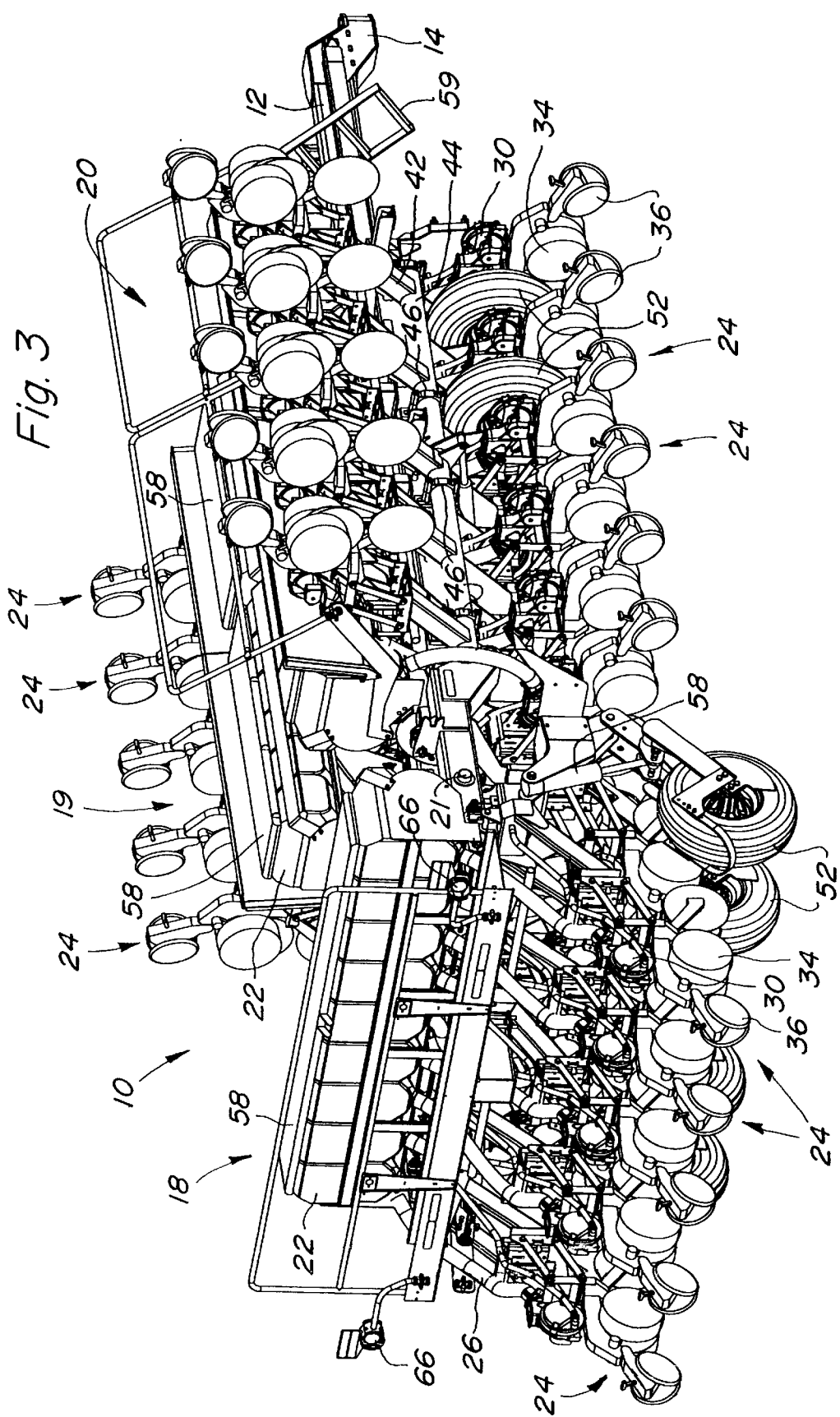
FIG. 3 is a rear perspective view of a seeding machine of the present invention in its transport configuration.
Figure 4:
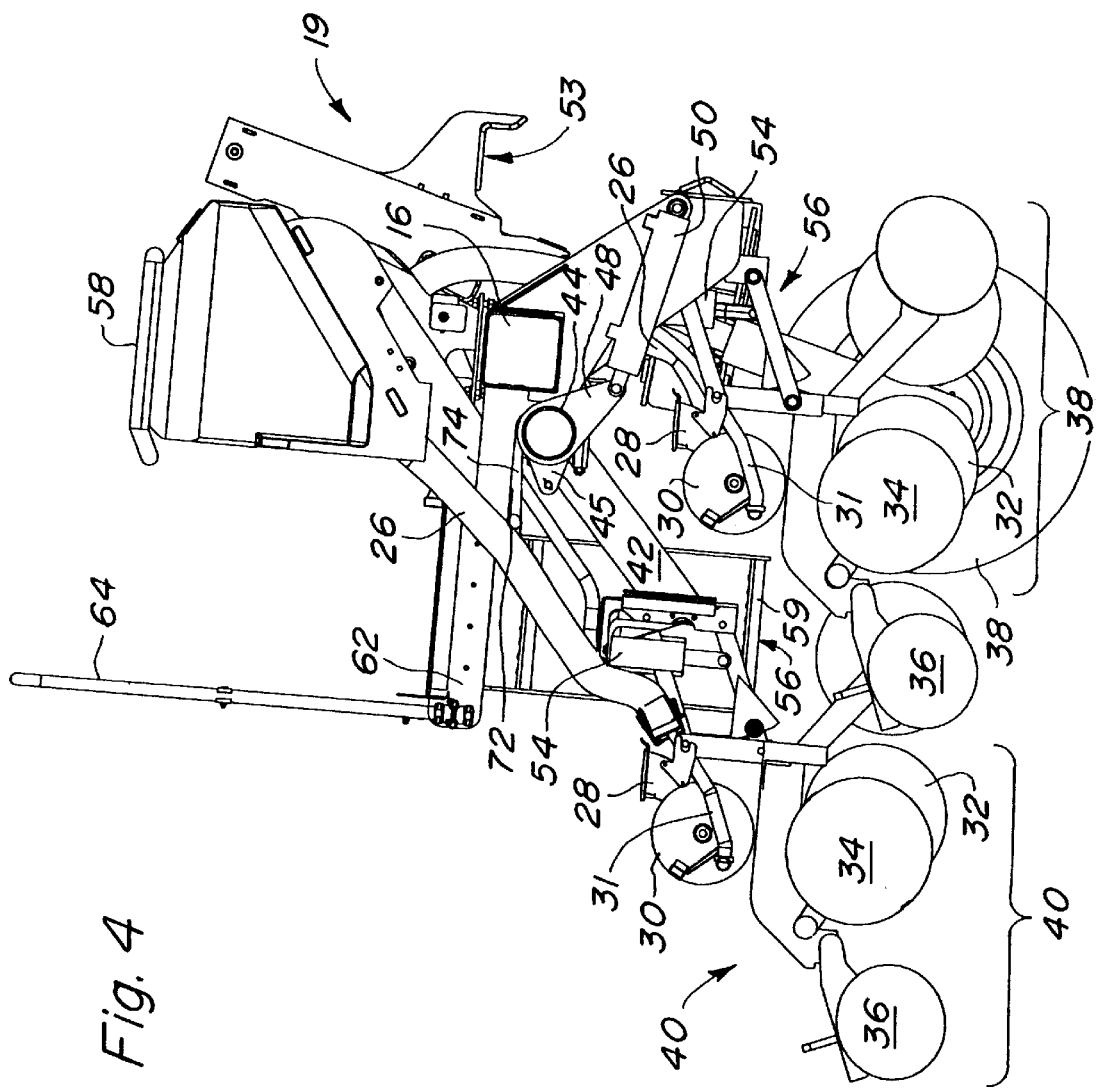
FIG. 4 is a left side view of a wing frame segment of the seeding machine illustrated in FIG. 2.
Figure 5:
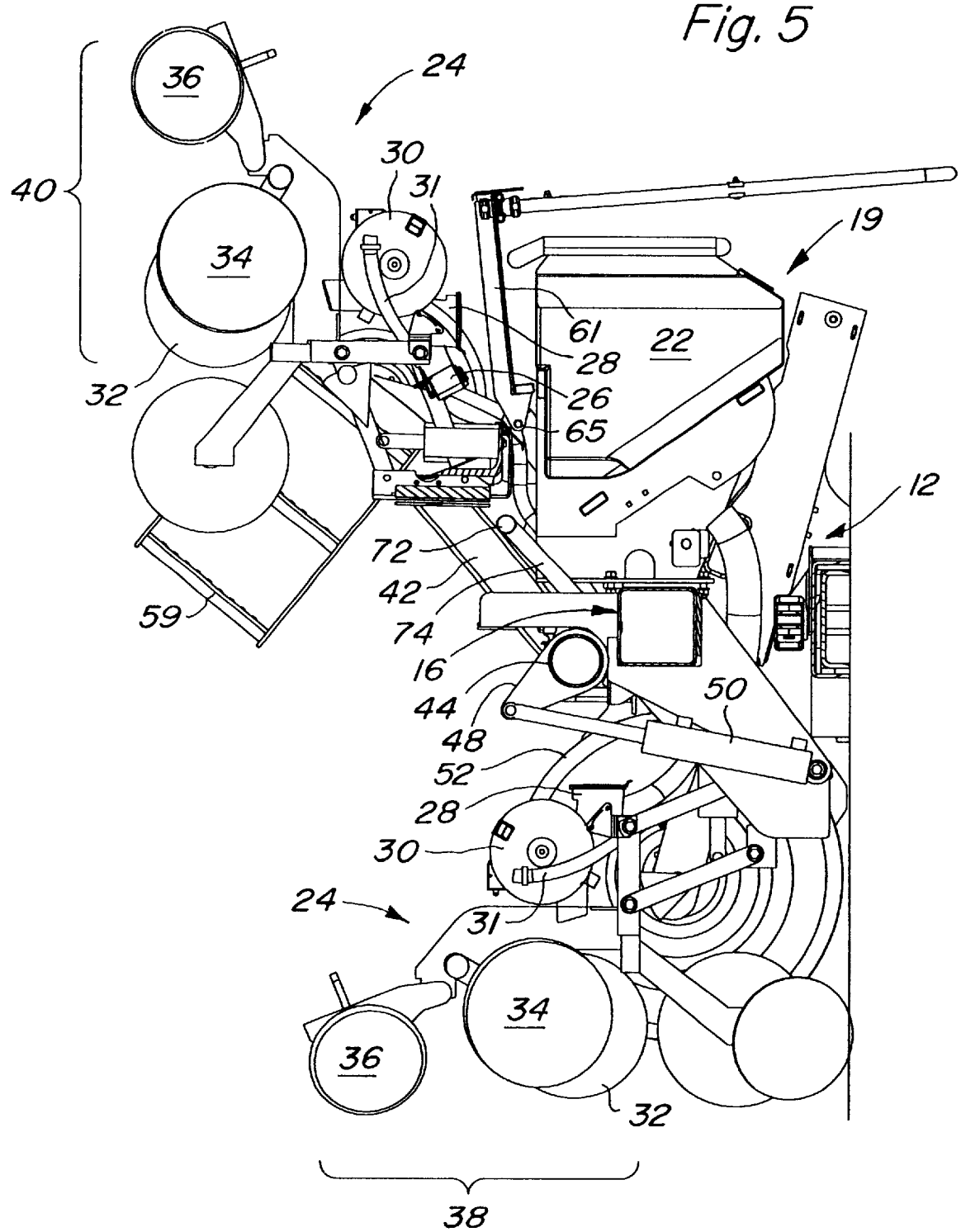
FIG. 5 is a left side view of a wing frame segment of the seeding machine illustrated in FIG. 3.

The pivot arms 42 can be rotated from their working position, illustrated in FIG. 1, to their transport position, illustrated in FIGS. 3 and 5, by the linear motors 50 driving the respective actuator bell cranks 48 of the rock shaft 44. In this way when the wing frame sections 19 and 20 are rotated forwardly, as illustrated in FIGS. 3 and 5, the rear ranks 40 of planting units 24 are rotated into their substantially vertical transport position, providing the seeding machine 10 with a more narrow transport width. The rockshaft 44 is provided with driven bell cranks 45 having lift links 47.

The frame segments 18,19 and 20 are provided with ground support wheels 52. The ground support wheels 52 contact the ground when the seeding machine 10 is in its working configuration. Downpressure to each planting unit 24 is applied by a pneumatic downpressure cylinder 54. The pneumatic downpressure cylinder 54 extends between the main and wing frame segments 18, 19 and 20 and the front rank 38 of planting units 24 and main frame segment 18 and the rear rank 40 of planting units 24. For the rear rank 40 of planting units 24 on the wing frame segments 19 and 20, the pneumatic downpressure cylinder 54 extends between the pivot arm 42 and the planting units 24. The pneumatic downpressure cylinders 54 engage a parallelogram linkage 56 joining the planting units to the respective frame segments 18 and 20 and pivot arms 42. The parallelogram linkage 56 allows the planting units 24 to follow the ground relative to the frame segments 18, 19 and 20 and pivot arms 42.

As the seeding machine is moved from its working configuration to its transport configuration, the main frame segment 18 ground support wheels 52 are extended by hydraulic cylinders 58 raising the frame 16. The wing frame segments 19 and 20 are pivoted forwardly until they engage the tow bar 12 with catches 53. The linear motors 50 are extended pivoting the rockshafts 44 by means of the actuator bell cranks 48. In this way, the pivot arms 42 and attached planting units 24 are rotated from their working position to their transport position.

The seed hoppers 22 are provided with access lids 58 for accessing the interior of the seed hoppers 22. To fill the seed hoppers 22 the operator mounts steps 59 onto operator walkway 60 and opens the access lids 58. The walkway 60 is located above the row units 24 when they are in their working position. The walkway 60 comprises a footboard 61 and a walkway frame 62. The walkway frame 62 is provided with railings 64 and warning lights 66. The footboard 61 on each of the wing frame segments 20 is pivotally coupled to a walkway frame 62 by footboard pin 65. The walkway frame 62 is pivotally coupled to the wing frame segments 19 and 20 by a walkway frame pin 66. The walkway frame pin 66 defines a second pivot axis that is parallel to the first pivot axis defined by the rockshaft 44. Similarly, the footboard pin 65 defines a third pivot axis that is parallel to the first and second pivot axes.

As linear motor 50 is extended, it rotates the rockshaft 44 by rotating driven bell crank 45 and moving lift link 47. The lift link 47 is coupled to the walkway frame 62 by lift link pin 68. The lift link 47 is provided with a lost motion slot 49. The lost motion slot 49 permits the pivot arms 42 to be raised a limited amount before the walkway frame 62 is pivoted relative to the wing frame segments 19 and 20. As the lift link 47 engages the walkway frame 62, the walkway frame 62 and the footboard 61 are pivoted about the walkway frame axis (second pivot axis) defined by walkway frame pin 66. Further rotation of the rockshaft 44 causes the rear ranks 40 of planting units 24 for the wing frame segments 19 and 20 to butt up against the footboard 61. Bumpers 70 mounted to the planting units 24 engage the underside of the footboard 61. The bumpers 70 automatically pivot the footboard 61 about the footboard pivot axis (third pivot axis) defined by footboard pin 65 relative to the walkway frame 62. In its final transport position the footboards 61 are sandwiched between the seed hoppers 22 and the rear ranks 40 of planting units 24 for the wing frame segments 19 and 20.

Transversely extending tube supports 72 are pivotally attached to the wing frame segments 19 and 20 by links 74. The tube supports 72 are located below the operator walkways 60 and support the flexible tubes 26 for the rear ranks 40 of planting units 24. The tube supports 72 rest on the rockshaft 44 when the seeding machine is in its working configuration. As the pivot arms 42 are pivoted to their transport position, the pivot arms 42 contact the tube support 72 raising the tube supports 72 with the pivot arms 42. The tube supports 72 lift the flexible tubes 26 preventing them from kinking when the planting units 24 are raised into their transport positions.

As shown in FIG. 6, the seeding machine 10 has a second working configuration wherein the front ranks 38 of planting units 24 are used for planting and the second rank of planting units are pivoted upwardly by the pivot arms 42 into an intermediate holding position. In the intermediate holding position the rear ranks 40 of planting units 24 are no longer in contact with the ground and only the front rank 38 of planting units are planting seed. In this way, the front ranks 38 of planting units 24 can be used to plant at a wider row spacing then when the rear ranks 40 of planting units 24 are employed. For example, when the rear ranks 40 are in their intermediate holding position, the front ranks 38 of the planting units 24 can be used to plant corn in thirty-inch rows. When the rear ranks 40 of planting units 24 are lowered the seeding machine 10 can be used to plant soybeans in fifteen-inch rows. To maintain the rear ranks 40 of planter units 24 in the intermediate holding position, a U-shaped stop 76 is provided which fits over the linear actuator 50 and blocks the retraction of the hydraulic cylinder.

Figure 8:
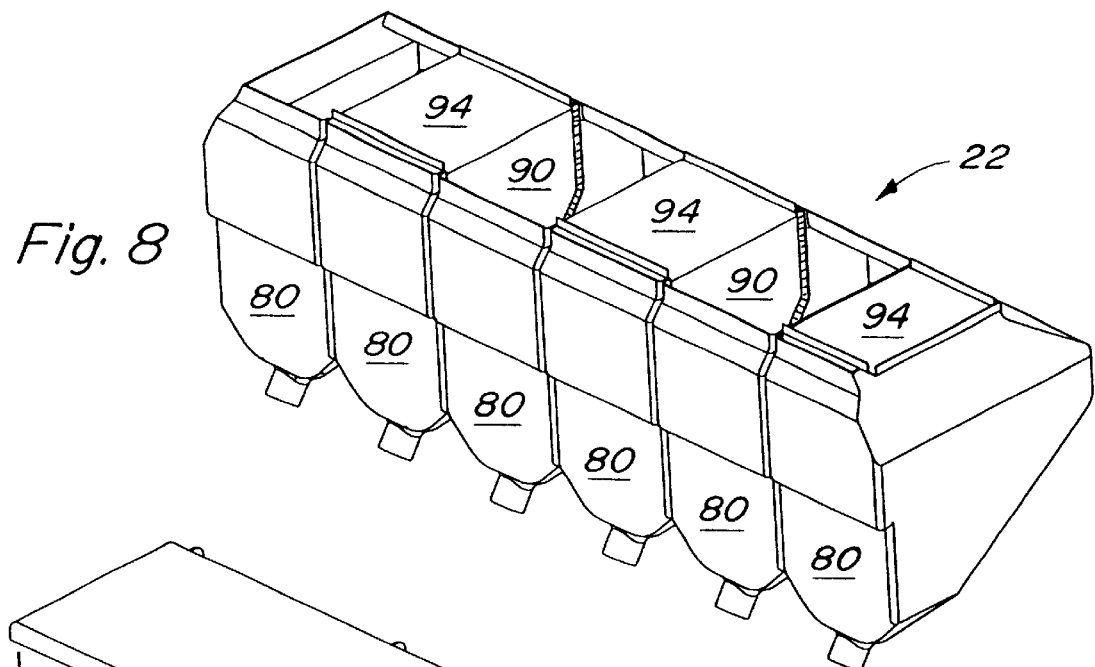
FIG. 8 is a perspective view of a bank of seed hoppers of the present invention.
Figure 9:
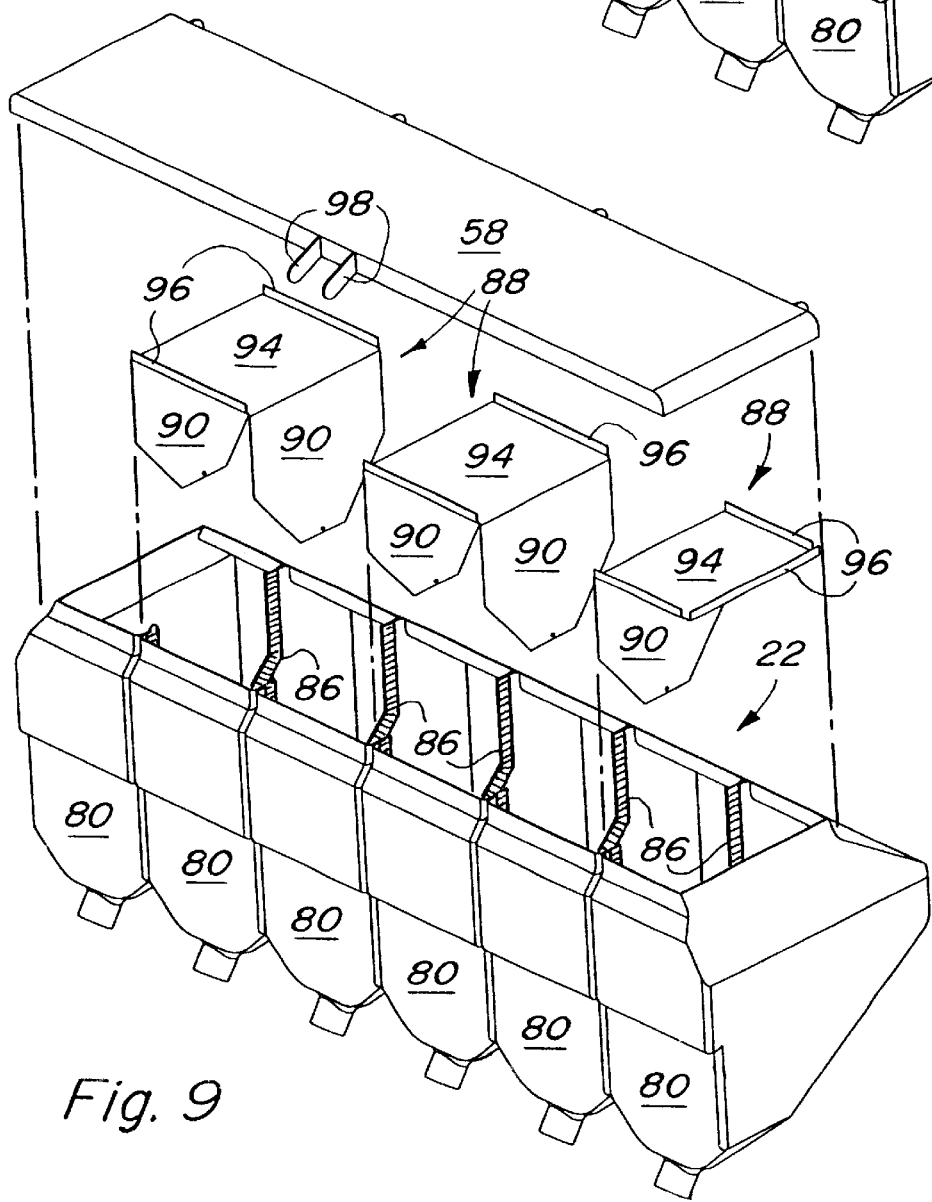
FIG. 9 is an exploded view of the bank of seed hopper in FIG. 8 with the detachable lid.

A bank of seed hoppers 22 is best illustrated in FIGS. 8–10. The bank of seed hoppers 22 comprises a series of individual plastic hoppers 80 having adjoining walls 82. The adjoining walls 82 are provided with notches 84 so that seed can flow from one individual hopper 80 to another when both the front and rear ranks 38 and 40 of planting units 24 are in their working configuration. The notches 84 are outlined by a seal 86 that overlies the adjoining walls 82 of the individual hoppers 80. When the rear ranks are raised into their intermediate holding position only half the planting units 24 are being used, so that alternating individual hoppers 80 feed non-working planting units 24. As such, the bank of seed hoppers 22 is provided with removable baffles 88 having downwardly extending legs 90 that engage the adjoining walls 82 of the individual hoppers 80. The downwardly extending legs 90 cooperate with the notches 84 to seal a working individual hopper 80 from the adjoining non-working individual hopper 80. The legs are provided with a horizontal cover 94 that prevent seed from being deposited into the non-working hopper. Please note there are two types of baffles 88, the rightmost baffle 88 in FIGS. 8–10 seals an end hopper 80 and the other two illustrated baffles 88 seal non-working hoppers 80 located between working hoppers 80. The baffle for the end hopper is provided with one downwardly extending leg 90, whereas the other two baffles 88 are provided with two downwardly extending legs. The covers 94 of the baffles 88 are provided with upwardly extending lips 96. The upwardly extending lips 96 engage the recessed underside of access lid 58 to better fix the position of the baffles 88 relative to the individual hoppers 80. The access lid 58 is pivotally secured to the frame segments 18, 19 and 20 by hinge arms 98.

Having described the preferred embodiment, it will become apparent that various modifications can be made without departing from the scope of the invention. For example, a mechanical seed meter or a positive pressure pneumatic seed meter may be used in place of the vacuum seed meter disclosed in the specification above. Similarly, the seed can be directed to the individual unit hoppers by a pneumatic seed on demand system from a central hopper, instead of a using the gravity delivery system disclosed in the specification above. Therefore the present invention should be limited solely by the claims that follow.

What is claimed is:

1. A seeding machine comprising:
    a frame;
    a bank of individual seed hoppers are mounted to the frame, the bank of individual seed hoppers having adjoining walls, the adjoining walls having notches allowing seed to pass between individual seed hoppers;
    an access lid is mounted to the bank of individual seed hoppers and provides access to the individual seed hoppers;
    planting units are mounted to the frame, each planting unit is provided with an auxiliary hopper for receiving seed from one of the individual hoppers;
    flexible tubes extend between the individual hoppers and the auxiliary hoppers of the planting units for transmitting seed from the individual hoppers to the planting units
    whereby a portion of the planting units can be placed in a non-working position and removable baffles can be inserted into the bank of individual hoppers for isolating the individual hoppers associated with the portion of planting units placed in the non-working position.

2. A seeding machine as defined by claim 1 wherein alternating planting units are placed in the non-working position and the removable baffles having downwardly extending legs are inserted into the bank of individual hoppers to engage the notches sealing the notches of the individual hoppers.

3. A seeding machine as defined by claim 2 wherein each removable baffle is provided with a horizontal cover that extends from at least one downwardly extending leg.

4. A seeding machine as defined by claim 3 wherein the horizontal cover is provided with upwardly extending lips that engage the access lid.

5. A seeding machine as defined by claim 4 wherein the access lid has a recessed underside in which the upwardly extending lips are received.

6. A seeding machine as defined by claim 5 wherein the access lid is pivotally attached to the frame.

* * * * *